United States Patent [19]

Brown, Jr.

[11] 4,424,914

[45] Jan. 10, 1984

[54] AIR BAG EXPLOSIVE DEVICE

[76] Inventor: Milton F. Brown, Jr., 2035 Echo Cove, Virginia Beach, Va. 23454

[21] Appl. No.: 391,975

[22] Filed: Jun. 24, 1982

[51] Int. Cl.³ .............................................. B65D 41/00
[52] U.S. Cl. ................................... 220/261; 137/68 A
[58] Field of Search ............................. 220/261, 89 A; 137/68 R, 68 A, 68–71; 222/3, 5; 280/736, 737

[56] References Cited

U.S. PATENT DOCUMENTS 4,077,423  3/1978  Kasagi et al. ..................... 137/68 A Primary Examiner—George T. Hall
Attorney, Agent, or Firm—Shlesinger, Arkwright, Garvey & Fado

[57] ABSTRACT

A completely separable seal for a container opening having a throat with a restriction therein including a casing, an explosive charge in the casing, a projectile tethered to the casing, the projectile including a thin completely separable peripheral diaphragm for closing the container throat having upper and lower surfaces, the charge mounted against the upper surface, means on the seal for engaging the throat restriction when the charge has been fired to subsequently limit downward thrust of the projectile into the container after separation of the diaphragm from the container throat to thus permit the projectile to reverse direction as the upward explosive forces overcome the downward explosive forces to thus propel the casing and tethered projectile from the container throat thus opening the container. The invention includes the complete closure for the container as well as the method of opening the rupturable sealed aperture.

53 Claims, 18 Drawing Figures

AIR BAG EXPLOSIVE DEVICE

This invention relates to a separable seal for a container opening having a throat with a restriction therein as well as the method for opening the sealed aperture.

HISTORICAL BACKGROUND

In the past, various devices have been developed for explosively opening containers for the purpose of releasing compressed gas in the containers. Rapid release of the gas is necessary where the application of a pressurized container is employed in a safety device such as an air bag for automobiles. The expansion time must be in milliseconds. In order to achieve a sudden release of large volumes of compressed gas, a large opening must be blown to effect substantially instantaneous release of high pressure gas. Noddin U.S. Pat. No. 3,780,752 shows a typical explosive actuated valve sealed by a frangible diaphragm. Moyant U.S. Pat. No. 3,670,925 is also a similar explosive frangible type device. Such typical valves can be used in high pressure systems of 5,000 psi or more and can release gas in less than 2 milliseconds. Typical of various attempts to achieve a stable and reliable system are Maxon U.S. Pat. Nos. 3,313,113 and Hopson 3,191,533. Mechanical devices have also been tried, including a plunger system such as disclosed in McDaniel U.S. Pat. No. 3,887,108.

In the Noddin and Moyant patents, stability of the system is made to rely on tempered glass.

Chute U.S. Pat. No. 3,638,964 proposes a system using an explosive system which can reduce noise but nevertheless is complex and difficult to manufacture and maintain for long periods of time.

OBJECTS AND SUMMARY

It is an object of this development to provide a means for rapidly opening a pressurized gas container to release a large volume of the gas in a very short period of time.

Another object of this invention is to provide a system which can be maintained under very adverse conditions of temperature and pressure such as for example 4,500 to 5,000 psi and 130° F.

Yet another object of this invention is to provide a cheap and inexpensive device which can be mass produced with standard equipment without the necessity of having complex apparatus and equipment or the need to obtain complex materials for manufacturing the device.

Still another object of this invention is to provide a blowout seal for high pressure cartridges which can be manufactured from a chosen steel, thereby eliminating the need for expensive materials.

Still another object of this invention is to provide a device which can be inserted in standard vessels and welded for structural strength therein with a minimum of difficulty and with standard equipment.

A further object of this invention is to provide a method of blowing out a large sealed area in order to obtain substantially instantaneous release of very high pressure gases in order to effect rapid inflation of a bag for safety purposes in automobiles and the like.

Yet a further object of this invention is to provide a seal projectile insertable in a pressure vessel which incorporates therewith a plastic case for the explosive charge and which when fired ejects both case and projectile simultaneously to clear the opening in the pressure vessel.

A further object of this invention is to provide a diffusion cap which can be secured to the seal for catching the projectile and case and diffusing the gases without the likelihood of any injury to a person who might be in close proximity to the device when it is fired.

In summary, this invention is designed to provide an explosive insert for a high pressure vessel which will automatically release gases quickly and safely.

These and other objects of this invention will be apparent from a study of the drawings in which the following figures are noted:

FIGS. 1 THROUGH 4

Figure 3:
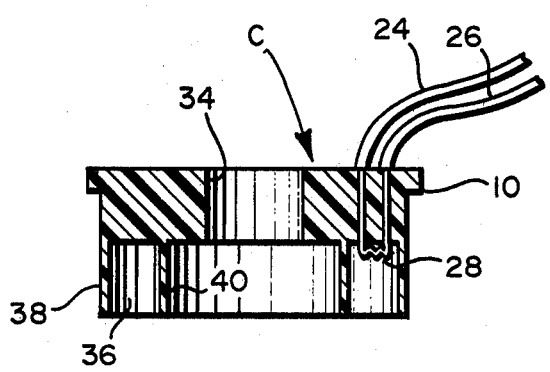
FIG. 3 is a cross-sectional view of the plastic case without the explosive and showing the firing wires.
Figure 1:
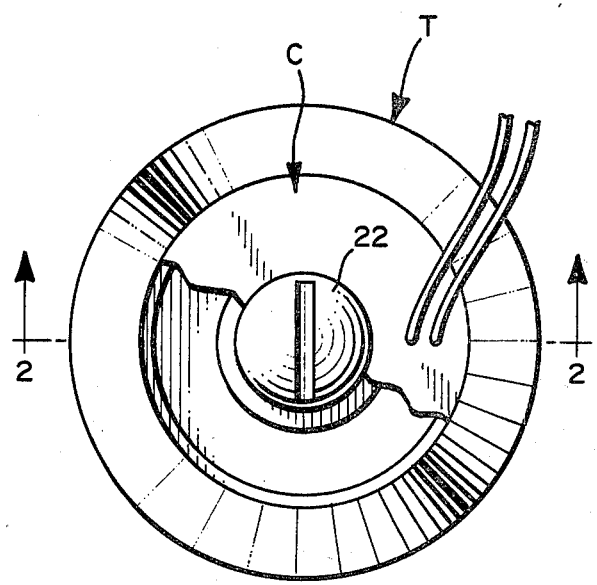
FIG. 1 is a top plan view of the rapid pressure release closure or insert.

In FIGS. 1 through 4, the insert T, with the exception of the propellant casing C as best shown in FIG. 3, is made in the case of high pressure vessels of stainless steel. The casing C may be made of plastic such as nylon or the like.

The insert T includes a sleeve 2 having a flange 4 which may be welded or otherwise secured to the opening of a pressure vessel. The sleeve 2 is provided with an internal shoulder or annular groove 6. The internal surface 8 of the sleeve 2 has a narrower diameter than the internal shoulder 6 to form a restricted opening. The casing C is provided with a flange 10 which seats in the internal shoulder 6. The insert T includes a projectile 12 of stainless steel having a base or lower portion 14 thicker than a peripheral diaphragm 16 which is integral with the sleeve 2.

Figure 2:
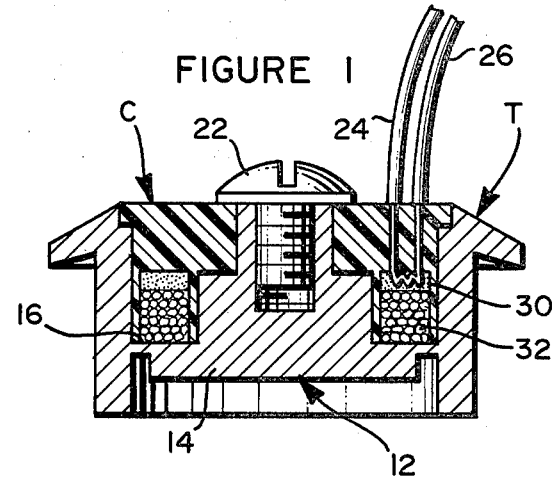
FIG. 2 is a cross-sectional view taken along the lines 2—2 of FIG. 1 and viewed in the direction of the arrows.

A stepped shank or stud 18 is provided with a threaded opening 20 for receiving a machine screw 22 which holds down the casing C. The casing C is provided with wire leads 24 and 26 connecting a bridge wire 28. The bridge wire is in contact with the primer 30 for the main charge 32 as best shown in FIG. 2. An opening 34 in the casing C is provided for positioning the casing C onto the stepped shank 18. As best seen in FIG. 2, the primer 30 and the main charge 32 are received in an annular groove 36 which is formed by concentric walls 38 and 40.

It should be noted that the charge 32 is directly over the diaphragm 16 so that when the insert T is fired, the pressure of the gases from the primer 30 and main charge 34 will force the diaphragm 16 downwardly to shear or rupture it from the wall or internal surface 8 of the sleeve 2. The downward travel will be limited by the shoulder 6 in which the flange 10 of the casing is trapped. Once the downward forces are overcome by the upward forces of the gases, the projectile 12, including the casing C, will move upwardly and out of the opening formed by the shearing of the diaphragm 16 from the wall of the sleeve 2.

Figure 4:
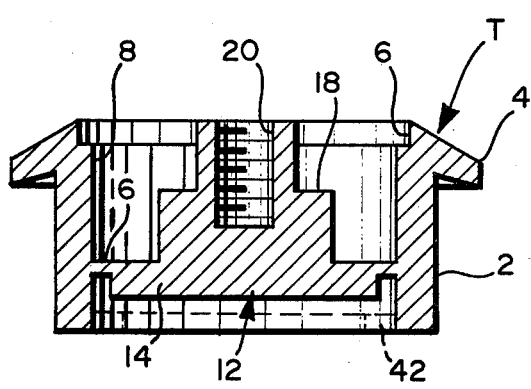
FIG. 4 is a cross-sectional view of the insert including the projectile with its peripheral diaphragm and the plastic casing removed.

An alternate form of the development is shown in FIG. 4 in the dotted lines. In this configuration, an annular ring 42 is provided beneath the base 14 of the projectile 12. The annular ring 42 prevents the projectile 12 from going any further downwardly and thus permits the charges to build up sufficiently to cause the projectile 12 and casing C to be removed entirely from the opening formed due to the shearing of the diaphragm 16 from the sleeve 2. It will be obvious in this modification, that the flange 10 and the internal shoulder 6 may be eliminated because of the annular ring 42 restricting the downward travel of the projectile 12 subsequent to the shearing of the diaphragm 16 from the wall 8 of the sleeve 2.

FIG. 5

Figure 5:
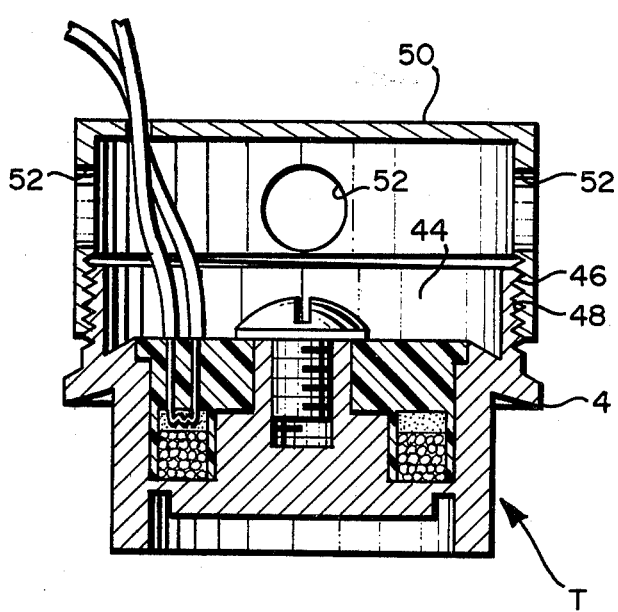
FIG. 5 is a cross-sectional view showing a modification of the insert including a diffusion cap secured to the top of the insert.

In FIG. 5, the flange 4 is provided with an upwardly extending sleeve 44 having threads 46 cooperating with threads 48 of a diffuser cap 50 which will catch the casing C and projectile 12 when they emerge from the opening of the sleeve 2. Ports 52 are provided for venting the gases rapidly as they are released from the vessel to which the insert T is attached.

FIGS. 6 AND 7

Figure 6:
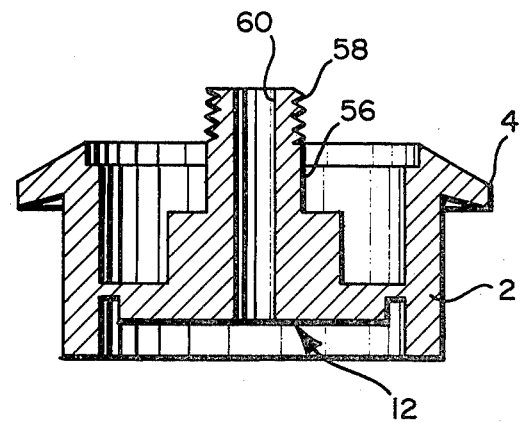
FIG. 6 is a cross-sectional view of a modification of the invention in which the insert is provided with a central opening to permit the vessel to which the insert is secured to be filled with pressurized gas.
Figure 7:
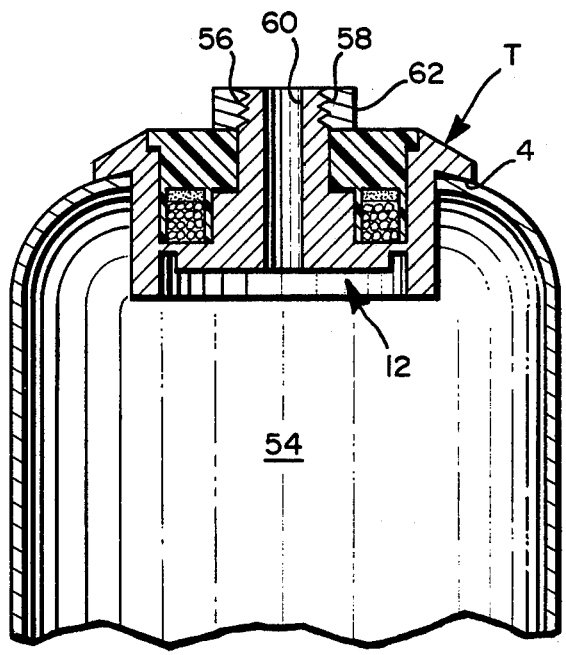
FIG. 7 is a fragmentary cross-sectional view of a pressurized vessel with the insert of FIG. 6 in place and showing a nut holding down a casing in the insert.
Figure 7:
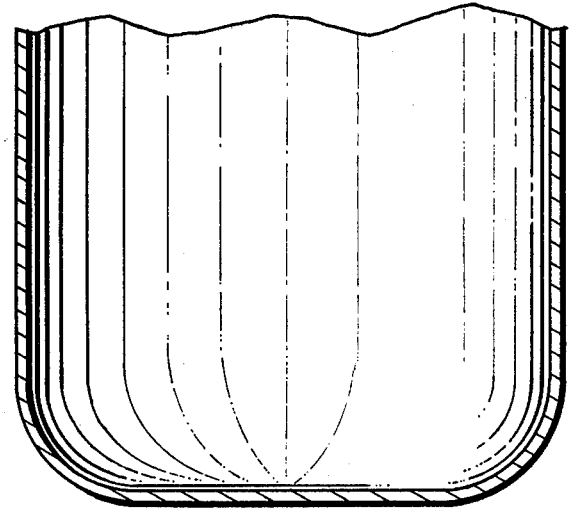
Figure 11:
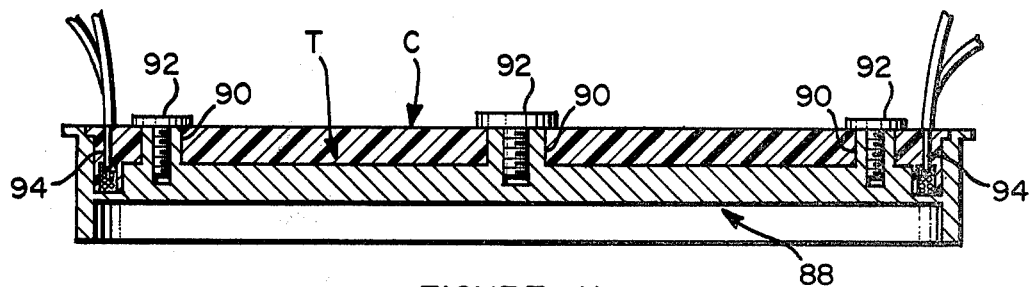
FIG. 11 is a cross-sectional view of a modification of the invention shown in FIG. 12 showing multiple firing mechanism and casing securing means taken along the lines of 11—11 in FIG. 12.
Figure 12:
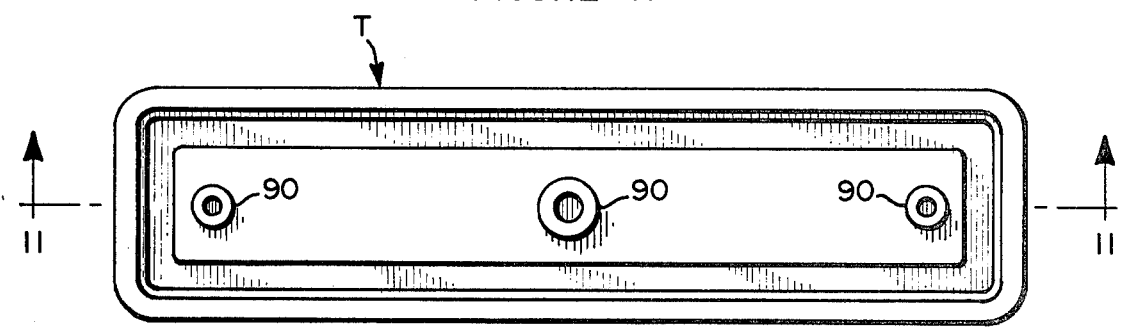
FIG. 12 is a top plan view of the modification of FIG. 11.
Figure 13:
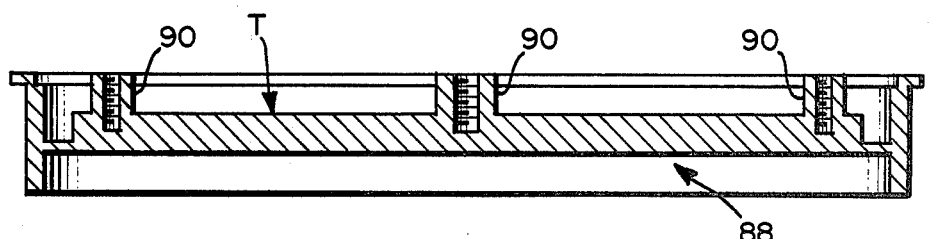
FIG. 13 is a cross-sectional view of the insert with the casing removed.
Figure 14:
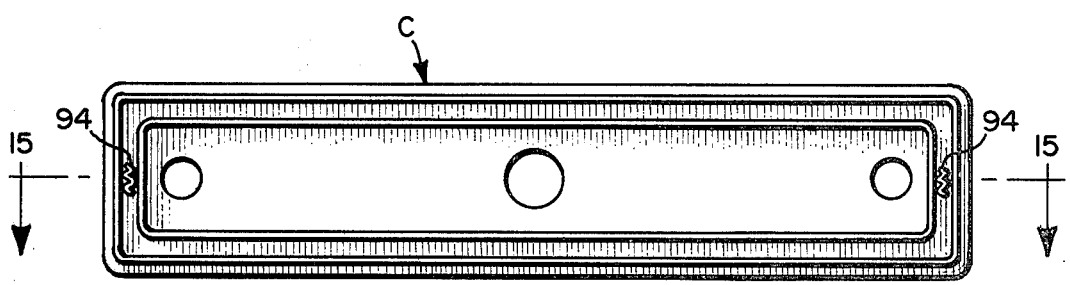
FIG. 14 is a bottom plan view of the casing with the insert removed.
Figure 15:
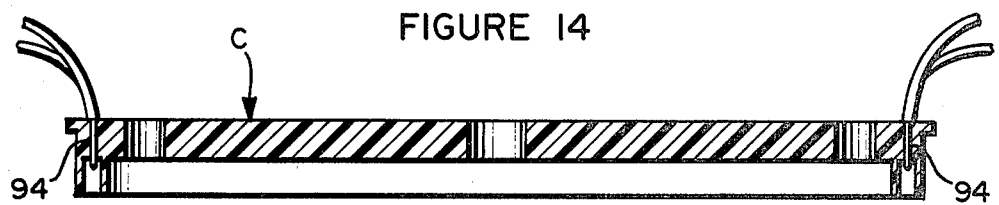
FIG. 15 is a cross-sectional view taken along the lines 15—15 of FIG. 14 and viewed in the direction of the arrows.

In FIGS. 6 and 7, the insert T is shown secured to a pressurized container 54 by welding or other means at the flange 4. The projectile 12 is modified to include a stepped shank 56 provided with threading 58 and a central opening 60. A nut 62 is threaded onto the stepped shank 56. The nut 62 serves the same purpose as the machine screw 22 for holding down the casing C as in FIG. 2. The hole or opening 60 is provided for pressurizing the container 54 and is designed to be sealed off once pressurization is effected. This sealing off is done by standard means such as a plug or the like (not shown).

FIGS. 8, 9 AND 10

Figure 8:
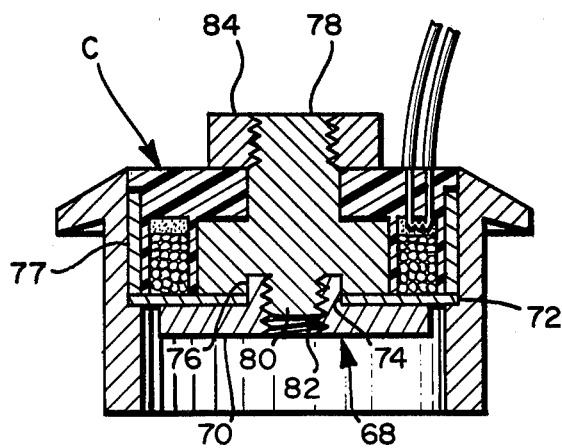
FIG. 8 is a modification of the invention showing a separable diaphragm including a threaded washer plate for securing the diaphragm in position and including an annular stake above the diaphragm for securing the unit in position within the external sleeve.
Figure 9:
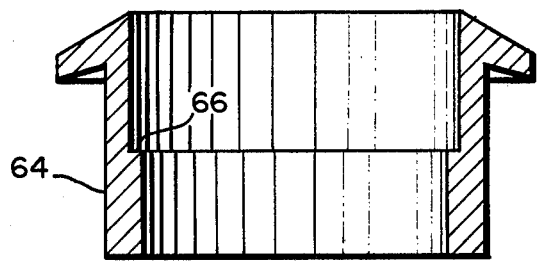
FIG. 9 is a cross-sectional view of the external sleeve of the insert.
Figure 10:
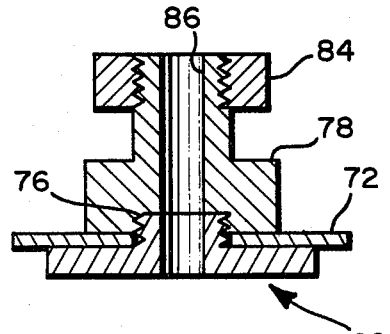
FIG. 10 is a cross-sectional view of a modified form of the projectile which would be used in the sleeve of FIG. 9.

In FIGS. 8, 9 and 10, modifications are provided in which a sleeve 64 is manufactured which is not integral with the projectile 12. The sleeve 64 has a recessed shoulder 66. The projectile 68 includes a threaded washer 70 for supporting the diaphragm plate 72. The diaphragm plate 72 has an opening 74 for receiving the upper shank 76 of the washer 70. A staking ring 77 holds down diaphragm 72. The stepped shank 78 includes a threaded stud 80 for engaging the threads of the opening 82 of the washer 70. A nut 84 secures the casing C to the stepped shank 78.

FIG. 10 shows the projectile 68 with a filling opening 86. In this modification, the upper shank 76 has external threads for engaging the stepped shank 78.

FIGS. 11 THROUGH 15

In FIGS. 11 through 15, the insert T includes a projectile 88 having a plurality of shanks 90 secured by a plurality of screws 92 for holding down the casing C which is rectangular. Other various configurations might also be utilized.

It will be noted also that a plurality of firing mechanisms 94 are provided.

FIGS. 16 AND 17

Figure 16:
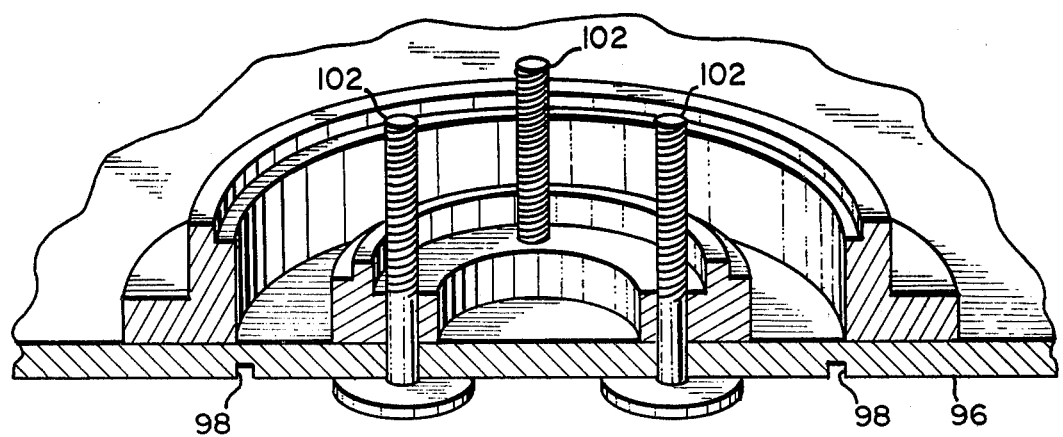
FIG. 16 is fragmentary perspective view, a portion of which is in cross-section showing a modification of this invention using multiple retaining means for the casing.
Figure 17:
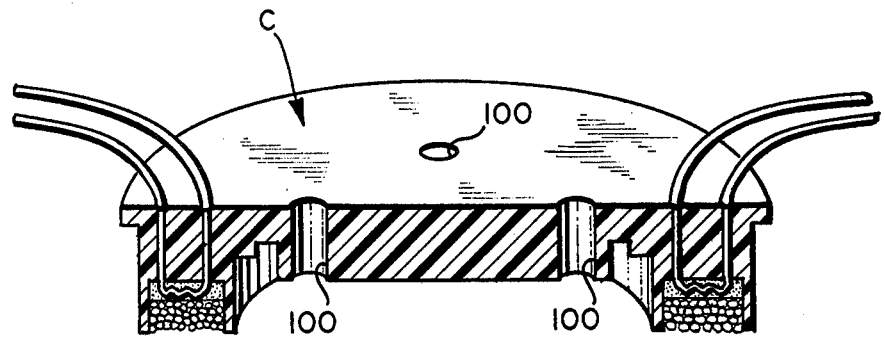
FIG. 17 is a cross-sectional perspective view of the casing used in FIG. 16.

In FIGS. 16 and 17, a larger opening is contemplated and the plate 96 is provided with a weakened separation groove 98. The casing C best shown in FIG. 17 includes a plurality of holes 100 for receiving bolts 102 to which are secured nuts (not shown) for holding the casing C to the general mechanism.

FIG. 18

Figure 18:
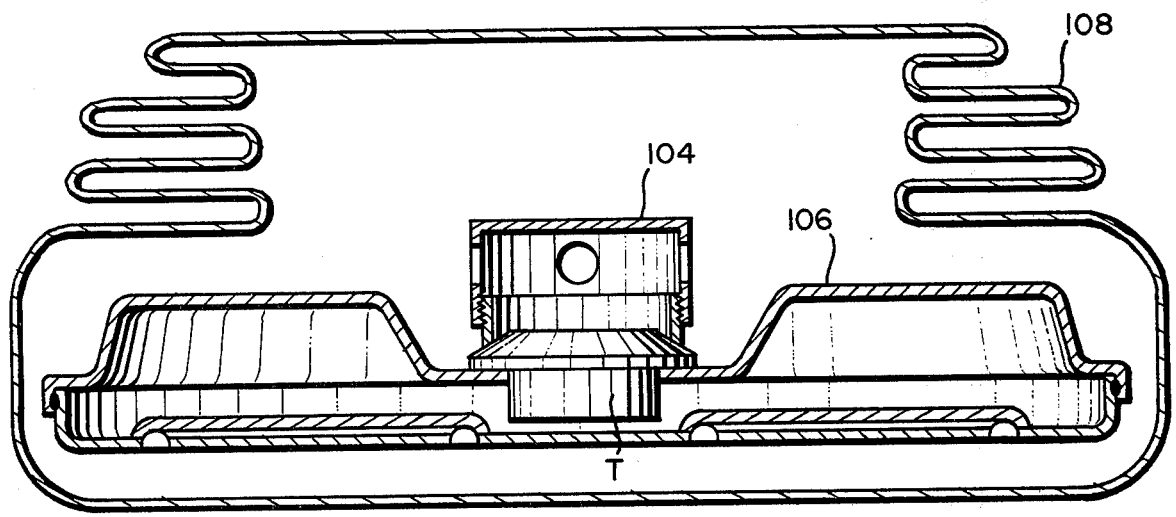
FIG. 18 is a cross-sectional view of a toroidal-type container with an insert having a diffuser cap in cross-section mounted thereon.

In FIG. 18, the insert T includes a diffusion cap 104. The insert T is mounted in a toroidal container 106. The toroidal container is designed to be mounted on a steering column and releases gas to an inflatable envelope or bag 108. Obviously, any means can be employed to secure the container 106 to the bag 108 and thus to the steering column (not shown).

OPERATION

The operation of the devices described in FIGS. 5 through 18 is similar to the operation in FIGS. 1 through 4 as heretofore described.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains, and as may be applied to the essential features hereinbefore set forth and fall within the scope of this invention or the limits of the claims.

I claim:
1. The method of opening a shearable sealed aperture, comprising the steps of:
   (a) positioning an explosive charge between a seal and a casing;

(b) tethering said casing to said seal;

(c) exploding said charge against said seal to produce exploding gases having both upward and downward components;

(d) driving said seal downwardly with said downward exploding gases to drive at least a portion of said seal downwardly in said aperture a distance sufficient to completely shear said seal from said aperture; and, (e) limiting the downward displacement of said seal by means of said tethered casing while permitting said upward exploding gases to increase in pressure on said seal and thereby causing said tethered casing and seal to move upwardly and out of said aperture.

2. The method of claim 1 and including the steps of:
(a) maintaining a portion of said seal against downward movement.

3. The method of claim 2 including the steps of:
(a) catching said seal after it has cleared said aperture.

4. The method of claim 1 and including the steps of:
(a) preventing lateral expansion of the exploding gases in said aperture.

5. The method of opening and quickly releasing pressurized gases in a first pressurized vessel having a shearable sealed aperture, comprising the steps of:
(a) positioning an explosive charge between a seal and a casing;
(b) tethering said casing to said seal;
(c) exploding said charge against said seal to produce exploding gases having both upward and downward components;
(d) driving said seal downwardly with said downward exploding gases to drive at least a portion of said seal downwardly in said aperture a distance sufficient to completely shear said seal from said aperture;
(e) limiting the downward displacement of said seal by means of said tethered casing while permitting said upward exploding gases to increase in pressure on said seal and thereby causing said tethered casing and seal to move upwardly and out of said aperture; and,
(f) subsequently rapidly releasing pressurized fluid from said vessel through said aperture.

6. The method of claim 5 and including the steps of:
(a) providing a wide aperture in said pressurized vessel.

7. The method of claim 6 and including the steps of:
(a) releasing said pressurized fluid into a second vessel for the purpose of pressurizing said second vessel.

8. The method of claim 7 and including the step of:
(a) inflating said second vessel.

9. The method of claim 8 and including the step of:
(a) releasing a large volume of high pressure fluid in said first vessel into said second vessel in substantially a fraction of a second to inflate said second vessel in substantially a fraction of a second.

10. A completely separable seal for a container opening having a throat with a restriction therein including:
(a) a casing;
(b) an explosive charge in said casing;
(c) a projectile tethered to said casing;
(d) said projectile including a thin completely separable peripheral diaphragm for closing said container throat having upper and lower surfaces;
(e) said charge mounted against said upper surface;
(f) means on said seal for engaging said throat restriction when said charge has been fired to subsequently limit downward thrust of said projectile into said container after complete separation of said diaphragm from said container throat to thus permit said projectile to reverse direction as the upward explosive forces overcome the downward explosive forces to thus propel the casing and tethered projectile from the container throat thus opening the container.

11. A completely separable seal as in claim 10 and wherein:
(a) said casing includes a flange for engaging said throat restriction.

12. A completely separable seal as in claim 10 and wherein:
(a) said projectile includes means for engaging said throat restriction.

13. A completely separable seal as in claim 11 and wherein:
(a) said casing includes a pair of thin concentric walls for receiving said charge.

14. A completely separable seal as in claim 12 and wherein:
(a) said casing includes a pair of thin parallel walls for receiving said charge.

15. A completely separable seal as in claim 10 and wherein:
(a) said casing includes a charge firing means.

16. A completely separable seal as in claim 10 and wherein:
(a) said projectile includes a stud extending through said casing; and,
(b) said stud includes means for engaging said casing for tethering said projectile to said casing.

17. A completely separable seal as in claim 16 and wherein:
(a) said means for engaging said casing includes a threaded member.

18. A completely separable seal as in claim 17 and wherein:
(a) said stud includes container filling means.

19. A completely separable seal as in claim 18 and wherein:
(a) said container filling means includes a central passageway in said threaded member.

20. A completely separable seal as in claim 10 and wherein:
(a) said projectile includes a thickened central portion adjacent said peripheral diaphragm.

21. A completely separable seal as in claim 10 and wherein:
(a) said projectile includes a main body portion; and,
(b) said diaphragm is removable from said main body portion.

22. A completely separable seal as in claim 21 and wherein:
(a) said main body portion includes threaded means for securing said diaphragm thereto.

23. A completely separable seal as in claim 17 and wherein:
(a) said threaded member includes a holding screw.

24. A completely separable seal as in claim 17 and wherein:
(a) said threaded member includes a holding nut.

25. A completely separable seal as in claim 17 and including:
(a) plurality of studs extending through said casing.

26. A completely separable seal as in claim 10 and wherein:
(a) said casing and said projectile are circular.

27. A completely separable seal as in claim 10 and wherein:
(a) said casing and said projectile are rectangular.

28. A completely separable seal as in claim 15 and including:
(a) a plurality of said charge firing mechanisms spaced from each other.

29. A rapid pressure release closure for a container having an opening therein including:
(a) a sleeve secured in said opening;
(b) said sleeve including a throat having upper and lower portions and a restriction therein;
(c) a completely separable seal mounted in said throat;
(d) said seal including a casing;
(e) an explosive charge in said casing;
(f) a projectile tethered to said casing;
(g) said projectile including a thin completely separable peripheral diaphragm for closing said container throat having upper and lower surfaces;
(h) said charge mounted against said upper surface; and,
(i) means on said seal for engaging said throat restriction when said charge has been fired to subsequently limit downward thrust of said projectile into said container after complete separation of said diaphragm from said container throat to thus permit said projectile to reverse direction as the upward explosive forces overcome the downward explosive forces to thus propel the casing and tethered projectile from the container throat thus opening the container.

30. A rapid pressure release closure as in claim 29 and wherein:
(a) said restriction is in the upper portion of said throat.

31. A rapid pressure release closure as in claim 29 and wherein:
(a) said restriction is in the lower portion of said throat.

32. A rapid pressure release closure as in claim 29 and wherein:
(a) said casing includes a flange for engaging said throat restriction.

33. A rapid pressure release closure as in claim 29 and wherein:
(a) said projectile includes means for engaging said throat restriction.

34. A rapid pressure release closure as in claim 32 and wherein:
(a) said casing includes a pair of thin concentric walls for receiving the charge.

35. A rapid pressure release closure as in claim 33 and wherein:
(a) said casing includes a pair of thin concentric walls for receiving the charge.

36. A rapid pressure release closure as in claim 29 and wherein:
(a) said casing includes a charge firing mechanism.

37. A rapid pressure release closure as in claim 29 and wherein:
(a) said projectile includes a stud extending through said casing; and,
(b) said stud includes means for engaging said casing for tethering said projectile to said casing.

38. A rapid pressure release closure as in claim 37 and wherein:
(a) said means for engaging said casing includes a threaded member.

39. A rapid pressure release closure as in claim 38 and wherein:
(a) said stud includes container filling means.

40. A rapid pressure release closure as in claim 39 and wherein:
(a) said container filling means includes a central passageway in said threaded member.

41. A rapid pressure release closure as in claim 29 and wherein:
(a) said projectile includes a thickened central portion adjacent said peripheral diaphragm.

42. A rapid pressure release closure as in claim 29 and wherein:
(a) said projectile includes a main body portion; and,
(b) said diaphragm is removable from said main body portion.

43. A rapid pressure release closure as in claim 42 and wherein:
(a) said main body portion includes threaded means for securing said diaphragm thereto.

44. A rapid pressure release closure as in claim 38 and wherein:
(a) said threaded member includes a holding screw.

45. A rapid pressure release closure as in claim 38 and wherein:
(a) said threaded member includes a holding nut.

46. A rapid pressure release closure as in claim 37 and including:
(a) plurality of studs extending through said casing.

47. A rapid pressure release closure as in claim 29 and wherein:
(a) said casing and said projectile are circular.

48. A rapid pressure release closure as in claim 29 and wherein:
(a) said casing and said projectile are rectangular.

49. A rapid pressure release closure as in claim 36 and including:
(a) a plurality of said charge firing mechanisms spaced from each other.

50. A rapid pressure release closure as in claim 42 and including:
(a) a second sleeve in said first mentioned sleeve for securing said removable diaphragm to said throat.

51. A rapid pressure release closure as in claim 29 and wherein:
(a) a said sleeve includes a gas diffuser cap having top and side walls for catching said casing and projectile.

52. A rapid pressure release closure as in claim 51 and wherein:
(a) said diffuser cap is threadedly secured to said sleeve.

53. A rapid pressure release closure as in claim 52 and wherein:
(a) said diffuser cap is closed at the top wall and includes port means in said side wall for venting gases.

* * * * *